May 29, 1956 A. J. SEILER 2,748,044
CONVEYER BELTING
Original Filed Jan. 28, 1952

INVENTOR:
Arthur J. Seiler,
BY Paul & Paul
ATTORNEYS.

United States Patent Office 2,748,044
Patented May 29, 1956

2,748,044
CONVEYER BELTING

Arthur J. Seiler, Chadds Ford, Pa., assignor to Main Products Corporation, Philadelphia, Pa., a corporation of Pennsylvania Original application January 28, 1952, Serial No. 268,620, now Patent No. 2,696,865, dated December 14, 1954. Divided and this application January 5, 1954, Serial No. 402,303

7 Claims. (Cl. 154—52.1)

This invention relates to conveyer belting, the present application being a division of a co-pending application, Serial No. 268,620 filed by me on January 28, 1952 now Patent 2,696,865.

The advantages inherent in the transportation of material by apron belt conveyers has long been recognized by industry. For instance in the coal industry the use of apron or belt conveyers is much more practical and economical than transportation by intermittently moved mine cars. Apron conveyer belting, as heretofore constructed and in more or less common use, was fabricated largely of rubber reinforced with textile or metallic cords, or with duck fabric, or both. Conveyer belting, so constructed, undergoes considerable stretching on starting and, after relatively short periods in service, becomes permanently elongated. This condition presents a very serious problem which is difficult of correction, particularly where long belts are involved. As an example, the elongation of such belting upon starting, for a 2000 foot conveyer requiring 4000 feet of belting, is about 40 feet in the absence of special machinery for gradual drive acceleration. Even with elaborate take-up or automatic adjusting mechanism known in the art, it has been found that the maximum practical length for such conveyer belting is of the order of 2500 feet between pulley centers. Conveyer belting with steel cords embedded in rubber has also been suggested, but belting so constructed is too heavy and too expensive to warrant its general use. Such belting in 30 to 36 inch widths weigh over 20 pounds per running foot and costs about $20.00 per linear foot.

The chief aim of my invention is to overcome the aforementioned drawbacks and disadvantages. This objective is attained in practice, as hereinafter more fully disclosed, through provision of conveyer belting which has a continuous foundation or core strip of relatively thin steel or other suitably-hard flexible metal, and a sheathing of vulcanized rubber permanently bond-integrated with the metallic foundation or core strip. My improved belting is therefore comparatively light in weight and resistive to stretching under strong longtitudinal pull, and considerably less costly than conveyer beltings heretofore available on the market.

Other objects and attendant advantages will appear from the following detailed description and the attached drawings wherein.

Figure 1:
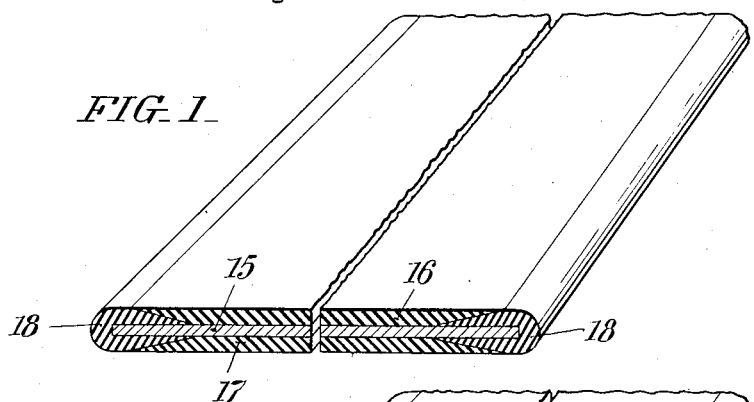
Fig. 1 is a sectional perspective view showing one form of my improved conveyer belting.

In the form illustrated in Fig. 1, my improved belting comprises a relatively thin foundation or core strip 15 which may be of steel known as Type 302 containing 18% chromium and 8% nickel having a semi-hard temper, and a thickness of .035 inch; and a sheathing of vulcanized rubber including top and bottom sheet layers 16 and 17, and edge-enveloping binding strips 18, the component parts of the sheathing being mutually bonded one to another and to said metallic core strip. Steels of composition other than the type mentioned by way of example, as well as other sufficiently hard flexible stretch resistant metals, can be employed of course for the foundation or core strip 15 if desired. As shown, the edging strips 18 are U-shaped in cross section and have sharply bevelled margins that lap corresponding marginal areas along the longitudinal side edges of the core strip 15. The rubber face layers 16, 17 also have sharply bevelled margins to coincide with and overlap the bevels of the edging strips 18 and, in this instance, are of a thickness to come flush with said edging strips.

The rubber used for the sheathing may be either of the natural variety, or one of the synthetic kinds such as neoprene or a copolymer such as acrylonitrile-butadiene, styrene-butadiene or isobutylene-butadiene. The thickness of the sheathing may be from about 1/16 to 3/8 inch according to the particular use for which the belting is intended.

Figure 2:
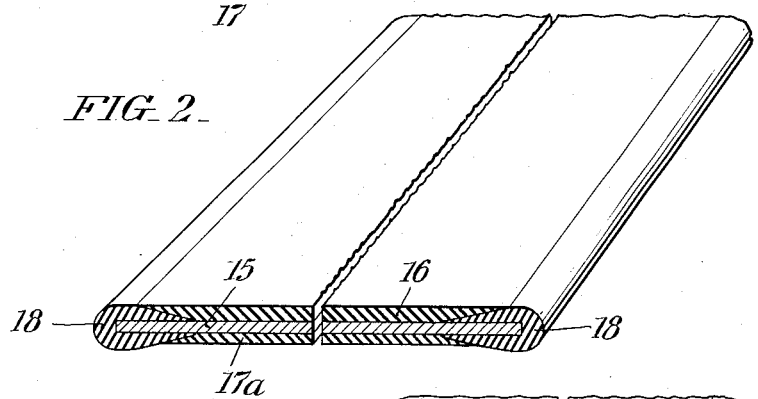
Figs. 2, 3 and 4 are views similar to Fig. 1 illustrating alternative forms of the belting.

The belting of Fig. 2 is like that of Fig. 1 except that the bottom face layer 17a of rubber is somewhat thinner than the upper face layer 16.

Figure 3:
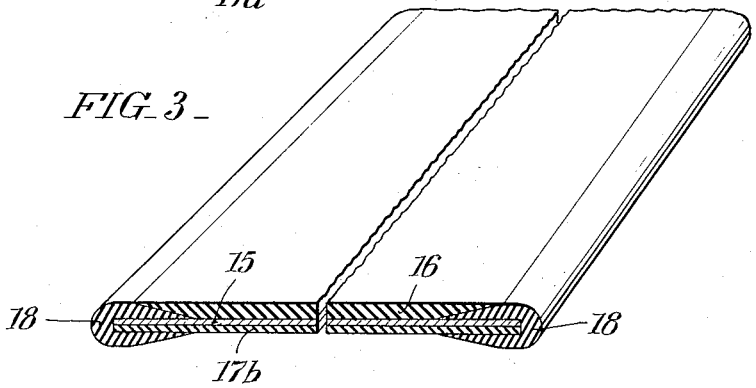

In the modification of Fig. 3, the bottom rubber face layer 17b is thin like that of Fig. 2 but of the same width as the metallic core strip 15 to which it is directly bonded. The rubber edging strips 18 are like those of the previous constructions, but their bottom flanges are overlapped upon and bonded to the thin bottom rubber layer 17b.

Figure 4:
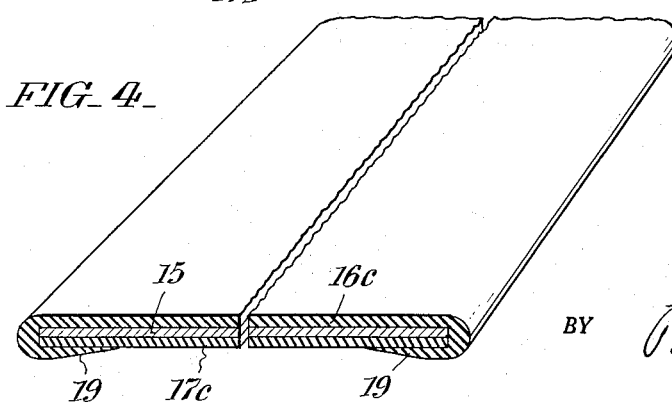

In Fig. 4, the bottom layer 17c corresponds in width to the metallic core strip 15 and is bonded thereto as in Fig. 3. In this instance, however, the upper rubber layer 16c is wider than the metallic core strip 15 and the sharply bevelled margins 19 thereof, after being turned about the side edges of the core strip 15, are overlapped upon or placed under the bottom rubber layer 17c.

In each of the three illustrated embodiments, the metallic foundation or core strip is completely surrounded by the rubber sheathing and thereby protected against deterioration. A further advantage of the disclosed constructions is that exposure of the side edges of the core strip, which if not protected, become razor sharp as the steel strip passes over idler rolls, is avoided. The possibility of injury by accidental contact with the belts, when in actual use, is thereby effectively precluded.

Having thus described my invention, I claim:

1. As a new product of manufacture, belting comprising a core strip of thin flexible sheet metal; and a surrounding sheathing composed of several longitudinally-extending strips of rubber, at least one of said rubber strips having portions surrounding the lengthwise edges of the core strip and bonded in marginally lapping relation to at least one of the other rubber strips.

2. As a new product of manufacture, belting comprising a core strip of thin flexible sheet metal; and a sheathing including edging strips of rubber which embrace the longitudinal edges of the core strip and marginally lap opposite side faces of the latter, and layers of rubber on opposite sides of the core strip overlapping margins of the edging strips.

3. Belting according to claim 2, wherein the lapped portions of the edging strips are beveled, and wherein the layers of rubber on opposite faces of the core strip have correspondingly beveled margins that coincide with and overlap the beveled margins of the edging strips.

4. Belting according to claim 3, wherein the rubber facing layers are of the same thickness and meet flush with rubber edging strips.

5. Belting according to claim 3, wherein one of the rubber facing layers is of a thickness to meet flush with the rubber edging strips, and wherein the other rubber facing layer is of a lesser thickness.

6. Belting according to claim 1, wherein one layer of rubber corresponds in width to the core strip and covers one face of the latter, wherein rubber edging strips with bevelled margins embrace the longitudinal edges of the metallic core strip and marginally lap the exposed face of one layer of rubber, and wherein the layer of rubber covering the opposite face of the core strip has bevelled margins to coincide with and overlap the corresponding bevelled margins of the rubber edging strips.

7. Belting according to claim 1, wherein a first layer of rubber corresponds in width to the metallic core strip and overlies one face of the latter, and wherein a second layer of rubber overlies the opposite face of the core strip, with marginal portions thereof extending about the longitudinal edges of the core strip and overlapping the first layer.

References Cited in the file of this patent

UNITED STATES PATENTS

| 2,321,580 | Conradson | June 15, 1943 |
| 2,429,119 | Bloomfield | Oct. 14, 1947 |

FOREIGN PATENTS

| 22,115 | Switzerland | June 22, 1900 |